United States Patent
Schmidt

(10) Patent No.: US 11,315,432 B2
(45) Date of Patent: Apr. 26, 2022

(54) LANDING AN UNMANNED AERIAL VEHICLE IN A CONTINGENCY SCENARIO

(71) Applicant: The Boeing Company, Chicago, IL (US)

(72) Inventor: Joerg Robert Oliver Schmidt, Ober-Ramstadt (DE)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 16/506,601

(22) Filed: Jul. 9, 2019

(65) Prior Publication Data

US 2021/0012666 A1  Jan. 14, 2021

(51) Int. Cl.
  *G08G 5/00* (2006.01)
  *B64C 39/02* (2006.01)
  *G05D 1/06* (2006.01)

(52) U.S. Cl.
  CPC .......... *G08G 5/006* (2013.01); *B64C 39/024* (2013.01); *G05D 1/0676* (2013.01); *G08G 5/0056* (2013.01); *G08G 5/0069* (2013.01); *B64C 2201/12* (2013.01); *B64C 2201/18* (2013.01)

(58) Field of Classification Search
  CPC .... G08G 5/006; G08G 5/0056; G08G 5/0069; B64C 39/024; B64C 2201/12; B64C 2201/18; G05D 1/0676
  See application file for complete search history.

(56) References Cited

U.S. PATENT DOCUMENTS

| | | |
|---|---|---|
| 8,521,343 B2 | 8/2013 | Spinelli |
| 8,798,922 B2 | 8/2014 | Tillotson et al. |
| 9,946,258 B2 | 4/2018 | Kwan |
| 2018/0019801 A1 | 1/2018 | Dowlatkhah et al. |
| 2018/0233050 A1 | 8/2018 | Valls Hernandez et al. |
| 2019/0033862 A1* | 1/2019 | Groden ................ G05D 1/0072 |

OTHER PUBLICATIONS

International Search Report dated Nov. 3, 2020 in the corresponding International Application No. 20183765.5.

(Continued)

*Primary Examiner* — Michael D Lang
(74) *Attorney, Agent, or Firm* — Womble Bond Dickinson (US) LLP

(57) ABSTRACT

An apparatus is provided for causing an unmanned aerial vehicle (UAV) to perform a contingency landing procedure. The apparatus includes memory and processing circuitry configured to cause the apparatus to at least determine candidate safe landing zones (SLZs) within an estimated current range of the UAV. Trajectories are generated for landing the UAV in respective ones of the candidate SLZs. Risk values are calculated that quantify third-party risk associated with operation of the UAV along respective ones of the trajectories to the respective ones of the candidate SLZs. A flight termination risk value is calculated that quantifies third-party risk associated with immediately landing the UAV at the current position. The lowest of the risk values is compared with the flight termination risk value, and a sequence is executed to operate the UAV along the trajectory to the selected one of the candidate SLZs, or immediately land the UAV.

22 Claims, 9 Drawing Sheets

(56) References Cited

OTHER PUBLICATIONS

Castagno, J., et al. "Comprehensive Risk-Based Planning for Small Unmanned Aircraft System Rooftop Landing". Proceedings from the IEEE International Conference on Unmanned Aircraft Systems (ICUAS), Dallas, TX, USA, Jun. 12-25, 2018, pp. 1031-1040.
Primatesta, S., et al. "A Risk-Aware Path Planning Strategy for UAVs in Urban Environments". Journal of Intelligent & Robotic Systems, Springer, 2019, 15 pages. Retrieved from the Internet: <URL:https://link.springer.com/article/10.1007/s10846-018-0924-3> <DOI: 10.1007/s10846-018-0924-3>.
Pastor et al., "In-Flight Contingency Management for Unmanned Aerial Vehicles", American Institute of Aeronautics and Astronautics, Inc., Apr. 2009, pp. 1-15.
Ancel et al., "Real-time Risk Assessment Framework for Unmanned Aircraft System (UAS) Traffic Management (UTM)", American Institute of Aeronautics and Astronautics, Inc., Jun. 2017, pp. 1-17, retrieved from https://ntrs.nasa.gov/search.jsp?R=20170005780.
Di Donato et al., "An Off-Runway Emergency Landing Aid for a Small Aircraft Experiencing Loss of Thrust", American Institute of Aeronautics and Astronautics, Inc., Jan. 2015, pp. 1-13.
Usach et al., "Architectural Considerations Towards Automated Contingency Management for Unmanned Aircraft", American Institute of Aeronautics and Astronautics, Inc., Jan. 2017, pp. 1-13.
Shively et al., "Contingency management with Human Autonomy Teaming", NASA Ames Research Center, Mar. 2018, pp. 1-14.
Di Donato et al., "Evaluating Risk to People and Property for Aircraft Emergency Landing Planning", Journal of Aerospace Information Systems, May 2017, pp. 1-20.

\* cited by examiner

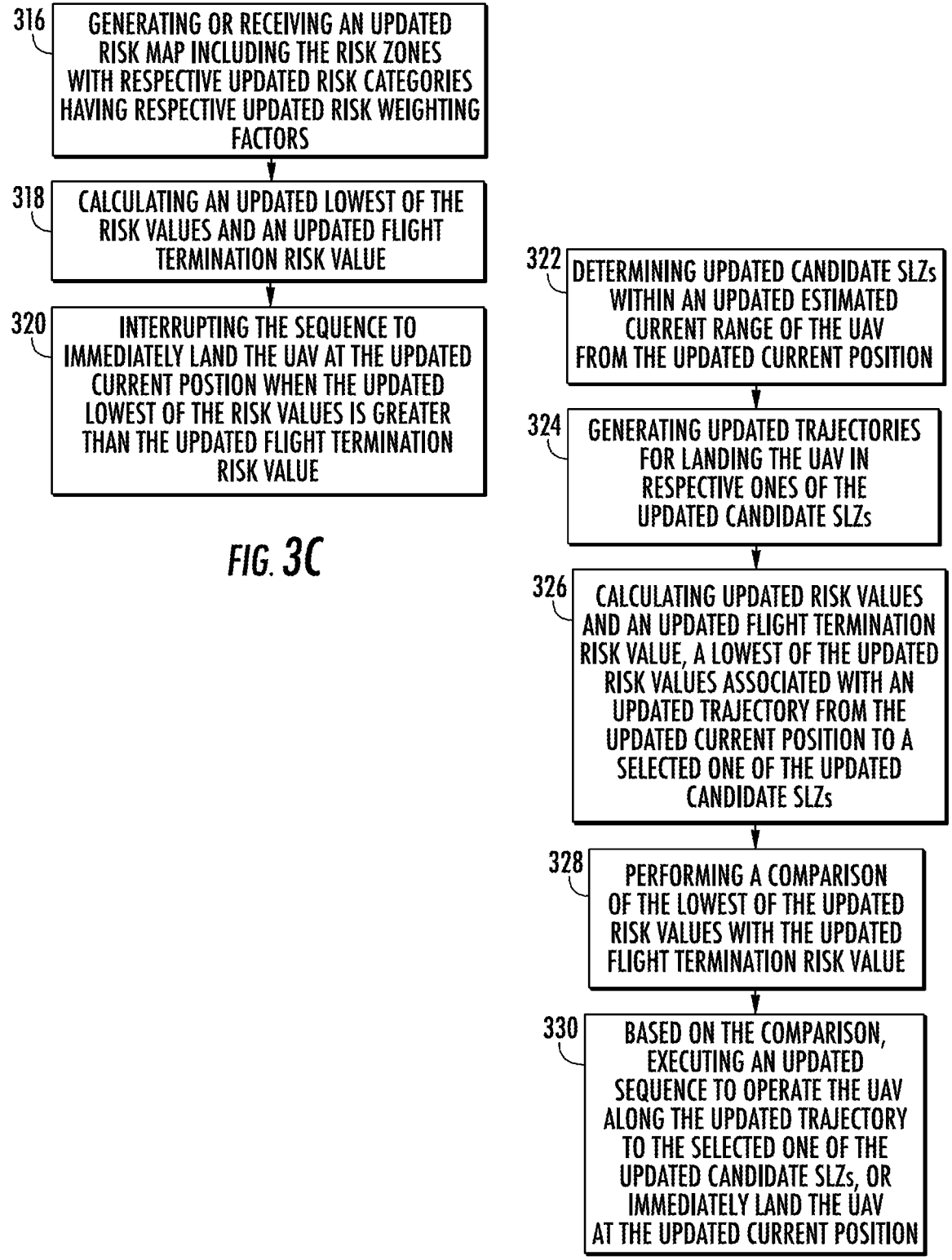

LANDING AN UNMANNED AERIAL VEHICLE IN A CONTINGENCY SCENARIO

TECHNOLOGICAL FIELD

The present disclosure relates generally to unmanned aerial vehicles, and in particular to landing an unmanned aerial vehicle in a contingency scenario.

BACKGROUND

Aircraft, particularly light aircraft and unmanned aerial vehicles (UAVs), often encounter contingencies that present obstacles to fulfilling a mission objective due to internal failures or unexpected changes of external circumstances. For example, a lost communication link or navigation capability are contingencies that can occur during UAV operation, and are driving scenarios for decision-making in some contingency situations. A lost communication link may render a UAV unable to communicate with a ground control station (GCS) from which the UAV may otherwise be remotely controlled. A loss of navigation capability may leave a UAV unable to follow commanded waypoints or trajectories, requiring manual control from a remote pilot-in-command at the GCS.

A contingency scenario may require a UAV to land at a location other than its intended landing site, but for UAVs flying over some terrains, this may present a significant challenge. Current techniques for landing a UAV in a contingency scenario include simple "return to home" (RTH) functions that send the UAV back to the location it took off from on a straight path above a specified altitude; alternate landing sites for this RTH function, with the closest one used instead of the takeoff location (also called "rally points"); or so-called "backtracking," in which the UAV follows its previous flight path or parts of it to reach either the takeoff location or an alternate site, following only previously flown paths. These solutions, however, do not consider third-party risk (risk to third parties) such as risk to people, road traffic, aircraft, structures and the like, in the spatial surroundings of the UAV. Existing solutions are therefore often less than desired in certain environments such as urban and suburban environments.

Therefore it would be desirable to have a system and method that takes into account at least some of the issues discussed above, as well as other possible issues.

BRIEF SUMMARY

Example implementations of the present disclosure are directed to an improved technique for landing an unmanned aerial vehicle (UAV) in a contingency scenario. Example implementations provide a contingency management system and procedure for a UAV that may improve operational safety with respect to the risk exhibited to third parties in the air and on the ground by enabling automated landings in contingency situations.

The procedure in some example implementations may follow a systematic approach based on a tiered quantitative risk assessment conducted by analyzing data covering factors affecting risk. This may enable use of data-driven risk assessments in handling contingencies. Safe landing zones (SLZs) may be introduced as alternate landing sites as a means to avoid flight termination or landings in unsafe areas in situations where a planned mission cannot continue.

The present disclosure thus includes, without limitation, the following example implementations.

Some example implementations provide a method of performing a contingency landing procedure for an unmanned aerial vehicle (UAV), the method comprising: determining candidate safe landing zones (SLZs) within an estimated current range of the UAV from a current position; generating trajectories for landing the UAV in respective ones of the candidate SLZs based on environmental and operational factors that affect flight of the UAV from the current position to the respective ones of the candidate SLZs; calculating risk values that quantify third-party risk associated with operation of the UAV along respective ones of the trajectories to the respective ones of the candidate SLZs, a lowest of the risk values associated with a trajectory from the current position to a selected one of the candidate SLZs; calculating a flight termination risk value that quantifies third-party risk associated with immediately landing the UAV at the current position; performing a comparison of the lowest of the risk values with the flight termination risk value; and executing a sequence to operate the UAV along the trajectory to the selected one of the candidate SLZs, or immediately land the UAV at the current position, based on the comparison.

In some example implementations of the method of any preceding example implementation, or any combination of any preceding example implementations, the UAV is part of an unmanned aerial system that also includes a ground control station (GCS), the method is performed onboard the UAV, and the sequence is autonomously executed without input from the GCS.

In some example implementations of the method of any preceding example implementation, or any combination of any preceding example implementations, the UAV is part of an unmanned aerial system that also includes a ground control station (GCS), the method is performed at the GCS, and the sequence is executed through remote control of the UAV from the GCS.

In some example implementations of the method of any preceding example implementation, or any combination of any preceding example implementations, the method further comprises: generating or receiving a risk map of a geographic area of operation of the UAV, the risk map including risk zones with respective risk categories having respective risk weighting factors that quantify third-party risk associated with operation of the UAV in the risk zones, wherein the trajectories intersect various ones of the risk zones, and the risk values are calculated based on the respective risk weighting factors.

In some example implementations of the method of any preceding example implementation, or any combination of any preceding example implementations, generating the trajectories includes for a candidate SLZ, interpolating a straight line from the current position to the candidate SLZ and thereby generating a trajectory to the candidate SLZ, and calculating the risk values includes for the trajectory: separating the trajectory into segments at points of intersection with one or more of the risk zones; and calculating a risk value for the candidate SLZ from the segments and risk weighting factors for the one or more of the risk zones.

In some example implementations of the method of any preceding example implementation, or any combination of any preceding example implementations, the straight line is a certain distance and includes a total number of discrete points over the certain distance, and separating the trajectory includes for each risk zone of the one or more risk zones: determining a ratio of a number of discrete points on the trajectory located inside the risk zone to the total number of the discrete points of the trajectory; and calculating the product of the ratio and the certain distance and thereby an intersection length of the risk zone.

In some example implementations of the method of any preceding example implementation, or any combination of any preceding example implementations, calculating the risk value for the candidate SLZ includes: calculating risk-zone risk values for respective ones of the one or more risk zones, a risk-zone risk value for the risk zone being the product of the intersection length of the risk zone and a risk weighting factor of a risk category of the risk zone; and summing the risk-zone risk values to calculate the risk value for the candidate SLZ.

In some example implementations of the method of any preceding example implementation, or any combination of any preceding example implementations, the sequence is executed to operate the UAV along the trajectory to the selected one of the candidate SLZs, and utilizing an updated current position along the trajectory, the method further comprises: generating or receiving an updated risk map of the geographic area of operation of the UAV, the updated risk map including the risk zones with respective updated risk categories having respective updated risk weighting factors; calculating an updated lowest of the risk values and an updated flight termination risk value based on the respective updated risk weighting factors; and interrupting the sequence to immediately land the UAV at the updated current position when the updated lowest of the risk values is greater than the updated flight termination risk value.

In some example implementations of the method of any preceding example implementation, or any combination of any preceding example implementations, the sequence is executed to operate the UAV along the trajectory to the selected one of the candidate SLZs when the lowest of the risk values is less than or equal to the flight termination risk value, and to immediately land the UAV at the current position when the lowest of the risk values is greater than the flight termination risk value.

In some example implementations of the method of any preceding example implementation, or any combination of any preceding example implementations, the sequence is executed to operate the UAV along the trajectory to the selected one of the candidate SLZs, and utilizing an updated current position along the trajectory, the method further comprises: calculating an updated lowest of the risk values and an updated flight termination risk value; and interrupting the sequence to immediately land the UAV at the updated current position when the updated lowest of the risk values is greater than the updated flight termination risk value.

In some example implementations of the method of any preceding example implementation, or any combination of any preceding example implementations, the sequence is executed to operate the UAV along the trajectory to the selected one of the candidate SLZs, and utilizing an updated current position along the trajectory, the method further comprises: determining updated candidate SLZs within an updated estimated current range of the UAV from the updated current position, the updated candidate SLZs including the selected one of the candidate SLZs; generating updated trajectories for landing the UAV in respective ones of the updated candidate SLZs; calculating updated risk values and an updated flight termination risk value, a lowest of the updated risk values associated with an updated trajectory from the updated current position to a selected one of the updated candidate SLZs; performing a comparison of the lowest of the updated risk values with the updated flight termination risk value; and executing an updated sequence to operate the UAV along the updated trajectory to the selected one of the updated candidate SLZs, or immediately land the UAV at the updated current position, based on the comparison.

Some example implementations provide an apparatus for causing an unmanned aerial vehicle (UAV) to perform a contingency landing procedure, the apparatus comprising a memory configured to store computer-readable program code; and processing circuitry configured to access the memory and execute the computer-readable program code to cause the apparatus to at least perform the method of any preceding example implementation, or any combination of any preceding example implementations.

Some example implementations provide a computer-readable storage medium for causing an unmanned aerial vehicle (UAV) to perform a contingency landing procedure, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3A, 3B, 3C and 3D are flowcharts illustrating various steps in a method of performing a contingency landing procedure for a UAV, according to example implementations of the present disclosure;

DETAILED DESCRIPTION

Figure 1A:
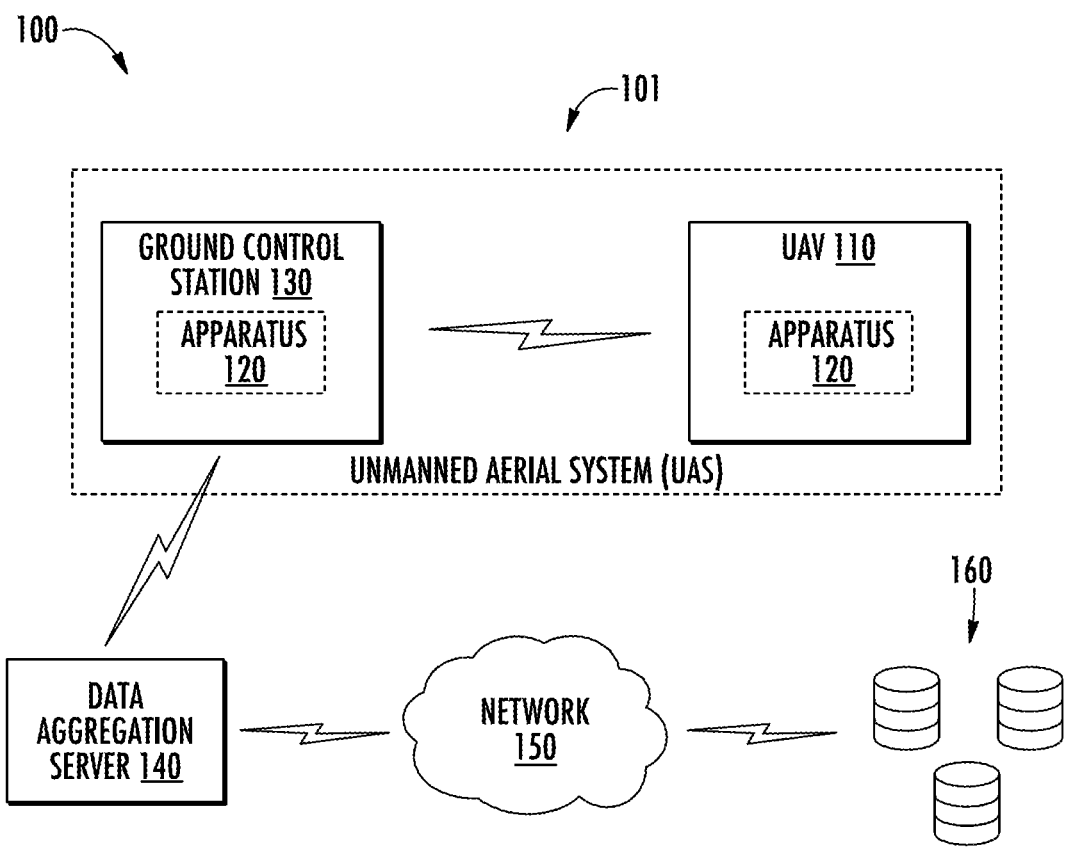
FIG. 1A illustrates a system including an unmanned aerial vehicle (UAV), according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are directed to unmanned aerial vehicles (UAVs), and in particular to data-driven, risk-minimizing route finding and landing of a UAV in a contingency scenario. Some example implementations of the present disclosure employ discretized trajectories to user-defined safe landing zones (SLZs), and selected risk weighting factors, to calculate a risk value based on risk mapping of an operating area of the UAV. As described herein, an SLZ is a landing zone (i.e., an area where the UAV can land) that has been designated as safe (low risk) in the event of a contingency scenario. Calculating risk values may allow for a comparison between multiple mission abort options to ascertain a most-desirable response to a specific contingency.

FIG. 1A illustrates a system according to example implementations of the present disclosure. The system may include any of a number of different subsystems (each an individual system) for performing one or more functions or operations. Although shown as part of the system, it should be understood that any one or more of the subsystems may function or operate as a separate system. It should also be understood that the system may include one or more additional or alternative subsystems than those shown in FIG. 1A.

As shown in FIG. 1A, in some examples, the system 100 includes an unmanned aerial system (UAS) 101 with a UAV 110 and a ground control station (GCS) 130 from which the UAV may be remotely controlled. In this regard, the UAV and GCS may communicate via a communication link. Additionally, the UAS includes an apparatus 120 that may be located onboard the UAV or at the GCS. Or in some examples, a first apparatus may be located onboard the UAV, and a second apparatus may be located at the GCS.

Figure 1B:
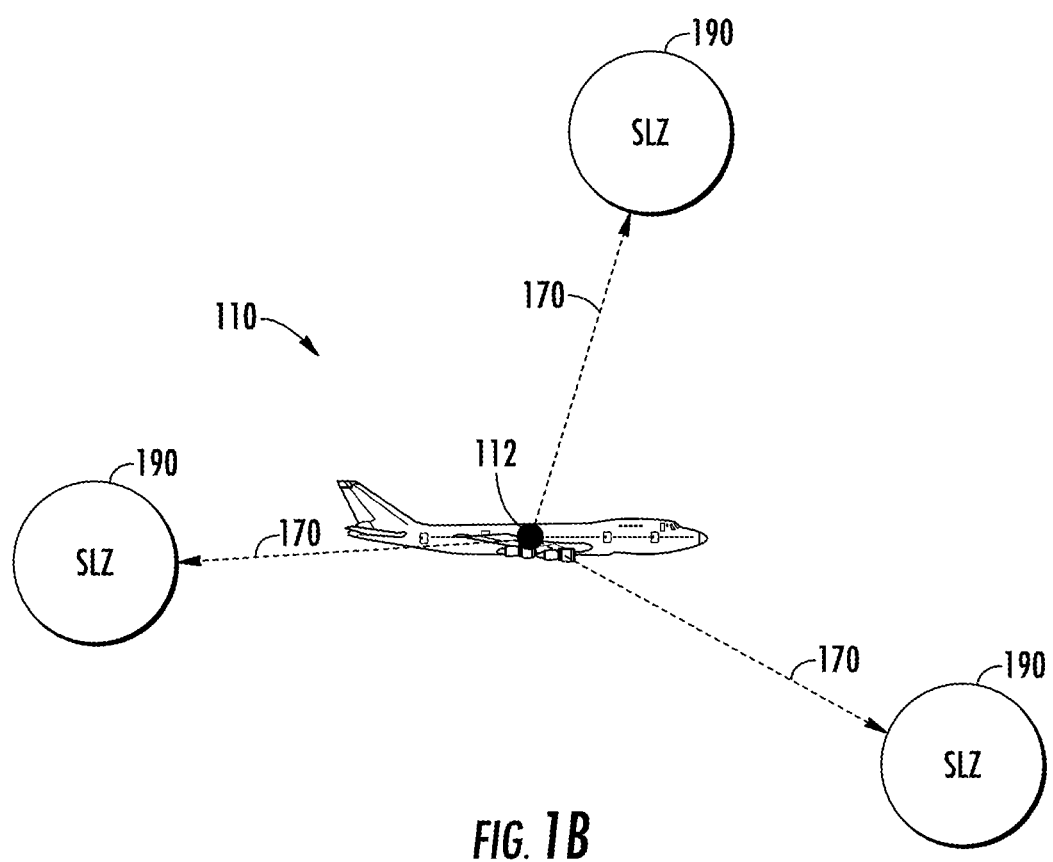
FIG. 1B illustrates the UAV of FIG. 1A having trajectories to respective safe landing zones, according to example implementations of the present disclosure.

In accordance with example implementations of the present disclosure, the apparatus 120 is for causing the UAV 110 to perform a contingency landing procedure. In this regard, the apparatus in some examples is configured to determine candidate SLZs 190 within an estimated current range of the UAV from a current position 112 (of the UAV), as shown in FIG. 1B. In these examples, the apparatus is configured to generate trajectories 170 for landing the UAV in respective ones of the candidate SLZs based on environmental and operational factors that affect flight of the UAV from the current position to the respective ones of the candidate SLZs.

In some examples, the trajectories 170 are or include one or more straight lines. In other examples, however, trajectories may be a non-straight-line or indirect trajectory. In this regard, one or more of the trajectories may be generated utilizing an algorithm that takes into account internal and external factors such as the terrain/topography, obstacles that should be avoided by the UAV 110, current wind direction and speed compared with the performance of the UAV, as well as the estimated current range of the UAV based on its current power level (the power needed to reach the SLZ following the generated trajectory). Examples of suitable algorithms include A-star, Voronoi graphs, and Rapidly Exploring Random Trees.

The apparatus 120 is configured to calculate risk values that quantify third-party risk associated with operation of the UAV 110 along respective ones of the trajectories 170 to the respective ones of the candidate SLZs 190. Here, a lowest of the risk values is associated with a trajectory from the current position 112 to a selected one of the candidate SLZs. The apparatus is also configured to calculate a flight termination risk value that quantifies third-party risk associated with immediately landing the UAV at the current position.

The apparatus 120 is configured to perform a comparison of the lowest of the risk values with the flight termination risk value. And based on the comparison, the apparatus is configured to execute a sequence to operate the UAV 110 along the trajectory to the selected one of the candidate SLZs 190, or immediately land the UAV at the current position 112. In some examples in which the UAV 110 includes the apparatus 120, the apparatus is configured to autonomously execute the sequence without input from the GCS 130. In other examples in which the apparatus is included in the GCS, the apparatus is configured to execute the sequence through remote control of the UAV from the GCS.

In some examples, the apparatus 120 is further configured to generate or receive a risk map of a geographic area of operation of the UAV 110. The risk map includes risk zones with respective risk categories having respective risk weighting factors that quantify third-party risk associated with operation of the UAV 110 in the risk zones. In these examples, the trajectories 170 intersect various ones of the risk zones, and the risk values are calculated based on the respective risk weighting factors.

Figure 2:
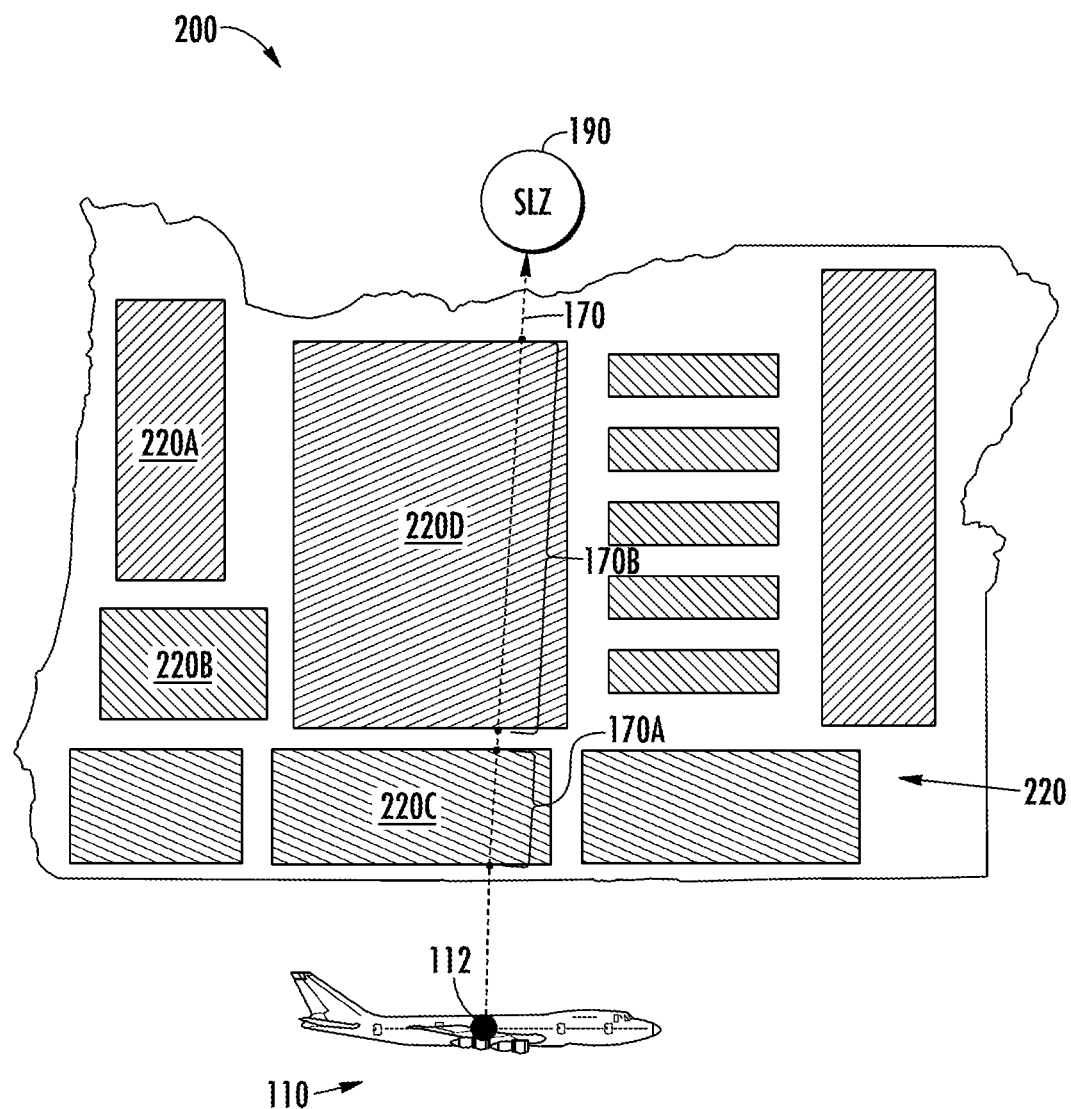
FIG. 2 illustrates a portion of a risk map having a plurality of risk zones, according to example implementations of the present disclosure.

FIG. 2 illustrates a portion of a risk map 200 according to example implementations of the present disclosure. The risk map 200 includes risk zones 220 (also referred to as risk zone polygons) that may be visually differentiated by various means such as color, pattern, shape, etc. In the illustrated example, the risk map includes risk zones 220A, 220B, 220C and 220D (one of each being labeled) with respective risk categories having respective risk weighting factors.

In some further examples in which the trajectories 170 are or include straight lines, for a candidate SLZ 190, the apparatus 120 is configured to interpolate a straight line from the current position 112 to the candidate SLZ and thereby generate a trajectory to the candidate SLZ. In some of these examples, the apparatus is configured to separate the trajectory into segments at points of intersection with one or more of the risk zones 220 (shown in FIG. 2 as segments 170A and 170B respectively intersecting risk zones 220C and 220D), and calculate a risk value for the candidate SLZ from the segments and risk weighting factors for the one or more of the risk zones. This may be achieved through a discretization of the trajectory by interpolation of a two-dimensional straight line segment between the current position of the UAV 110 and the SLZ. A cost function may then be used to compute a risk value from the intersecting segments and the risk weighting factors.

In some even further examples, the straight line of the trajectory 170 is a certain distance and includes a total number of discrete points over the certain distance. In these examples, separation of the trajectory includes, for each risk zone 220 of the one or more risk zones, the apparatus 120 configured to determine a ratio of a number of discrete points on the trajectory located inside the risk zone to the total number of the discrete points of the trajectory. The apparatus is then configured to calculate the product of the ratio and the certain distance and thereby an intersection length of the risk zone.

In some yet even further examples, the apparatus 120 is configured to calculate risk-zone risk values for respective ones of the one or more risk zones 220. In these examples, a risk-zone risk value for the risk zone is the product of the intersection length of the risk zone and a risk weighting factor of a risk category of the risk zone. In these yet even further examples, the apparatus 120 is configured to sum the risk-zone risk values to calculate the risk value for the candidate SLZ 190.

As indicated above, in some examples, calculation of the risk value associated with each SLZ 190 includes separation of the trajectory 170 into segments (e.g., segments 170A & 170B) intersecting respective risk zones 220. This may be achieved through a discretization of the trajectory by interpolation of the two-dimensional straight line segment between the current position of the UAV 110 and the SLZ. In this regard, a trajectory 170 may include a number of discrete points along its length, and a risk zone 220 may be formed of edges connected at vertices to form a closed, polygon shape. The apparatus 120 may determine if a point on the trajectory is located inside a given risk zone 220 defined by its vertices, in some examples according to a crossing numbers algorithm such as Franklin's PNPOLY algorithm. More specifically, the fraction of discrete points on the trajectory located inside a risk zone in relation to all of the discrete points on trajectory may be calculated as follows:

$$f_{k,j} = \frac{p_{k,j}}{q_k} \quad \text{(Eq. 1)}$$

In Eq. 1, $f_{k,j}$ is the fraction of the trajectory to the kth SLZ, within the jth risk zone, $p_{k,j}$ is the number of discrete points on the trajectory located inside the risk zone, and $q_k$ is the total number of discrete points on the trajectory.

The apparatus 120 may calculate the product of the ratio $f_{k,j}$ and the certain distance $s_k$ of the straight line from the current position 112 to the SLZ 190, and thereby the intersection length of the jth risk zone for the kth SLZ, such as according to the equation:

$$s_{k,j} = f_{k,j} \cdot s_k \quad \text{(Eq. 2)}$$

where $s_{k,j}$ is the intersection length of the jth risk zone for the kth SLZ.

The apparatus 120 may further calculate a risk-zone risk value for the risk zone 220 using a cost function in which the intersection length of the risk zone $s_k$ is multiplied by a risk weighting factor of the risk category of the jth risk zone (calculated as the product). This may be repeated for other risk zones intersected by the trajectory 170 to the kth SLZ to calculate respective risk-zone risk values for the risk zones, which may then be summed to calculate the risk value for the SLZ.

In some examples, the risk zones intersected by the trajectory 170 may be grouped by risk category, and the intersection length calculated per risk category. More specifically, the intersection length $S_{k,i}$ to the kth SLZ (of l candidate SLZs), for the ith risk category $\Gamma_i$, may be calculated as the sum of the intersection lengths $s_{k,j}$ for those risk zones, such as according to the equation:

$$S_{k,i} = \sum_{\substack{\Gamma(Z_j) \in \Gamma_i \\ \forall Z_j}} s_{k,j}, \forall \Gamma_i, \forall k \in \{0..l\} \quad \text{(Eq. 3)}$$

The product of the intersection length $S_{k,i}$ for the ith risk category and its respective risk weighting factor $W_i$ may be calculated to calculate a risk-category risk value. This may be repeated for other risk categories of risk zones intersected by the trajectory 170 to the kth SLZ to calculate respective risk-category risk values, which may then be summed to calculate the risk value $R_k$ for the kth SLZ, such as according to the following for n risk categories:

$$R_k = \sum_{i=1}^{n} W_i \cdot S_{k,i} \quad \text{(Eq. 4)}$$

The flight termination risk value may be determined in a manner similar to above but recognizing that the UAV 110 at its current position 112 may be located inside a risk zone 220, instead of following a trajectory 170 across risk zones. In some examples, then, the flight termination risk value corresponds to the risk weighting factor that quantifies third-party risk associated with operation of the UAV in the risk zone in which the UAV is located at its current position. In some example implementations, vision-based systems may be used in conjunction with or in alternative to the risk weighting factor.

In some examples, the apparatus 120 is configured to perform a comparison between the lowest of the calculated risk values $R_k$ and the risk for flight termination $R_{FT}$ at the current position 112 according to the equation:

$$\min\{\min_k\{R_k\}, R_{FT}\} \quad \text{(Eq. 5)}$$

Based on the comparison, the apparatus is caused to execute the sequence to operate the UAV 110 along the trajectory 170 to the selected one of the candidate SLZs 190 when the lowest of the risk values $$\min_k\{R_k\}$$

is less than or equal to the flight termination risk value $R_{FT}$, and to immediately land the UAV at the current position when the lowest of the risk values is greater than the flight termination risk value. The apparatus may be configured to recognize when the lowest of the risk values and the flight termination risk value are equal, and in response, execute the sequence to operate the UAV along the trajectory to the selected one of the candidate SLZs.

In some examples in which the sequence is executed to operate the UAV 110 along the trajectory 170 to the selected one of the candidate SLZs 190, and utilizing an updated current position 112 along the trajectory, the apparatus 120 is further configured to calculate an updated lowest of the risk values $$\left(\text{e.g., } \min_{k}\{R_k\}\right)$$

and an updated flight termination risk value (e.g., $R_{FT}$). And the apparatus is configured to interrupt the sequence to immediately land the UAV at the updated current position when the updated lowest of the risk values is greater than the updated flight termination risk value.

Similarly, in some examples, the apparatus 120 is further configured to generate or receive an updated risk map of the geographic area of operation of the UAV 110. The updated risk map includes the risk zones 220 with respective updated risk categories having respective updated risk weighting factors. In this regard, one or more of the respective updated risk categories and respective updated risk weighting factors may differ from the respective risk categories and respective risk weighting factors of the (earlier) risk map 200. In these examples, the apparatus is configured to calculate an updated lowest of the risk values and an updated flight termination risk value based on the respective updated risk weighting factors. The apparatus is then configured to interrupt the sequence to immediately land the UAV at the updated current position when the updated lowest of the risk values is greater than the updated flight termination risk value.

Additionally or alternatively, in some examples in which the sequence is executed to operate the UAV 110 along the trajectory 170 to the selected one of the candidate SLZs 190, the apparatus 120 is further configured to determine updated candidate SLZs within an updated estimated current range of the UAV from the updated current position 112. Here, the updated candidate SLZs include the selected one of the candidate SLZs.

In these examples, the apparatus 120 is configured to generate updated trajectories 170 for landing the UAV 110 in respective ones of the updated candidate SLZs 190, and calculate updated risk values (e.g., $R_k$) and an updated flight termination risk value $R_{FT}$. Similar to before, a lowest of the updated risk values $$\left(\text{e.g., } \min_{k}\{R_k\}\right)$$

is associated with an updated trajectory from the updated current position 112 to a selected one of the updated candidate SLZs. The apparatus is configured to perform a comparison of the lowest of the updated risk values with the updated flight termination risk value. And based on the comparison, the apparatus is configured to execute an updated sequence to operate the UAV along the updated trajectory to the selected one of the updated candidate SLZs, or immediately land the UAV at the updated current position.

Figure 3A:
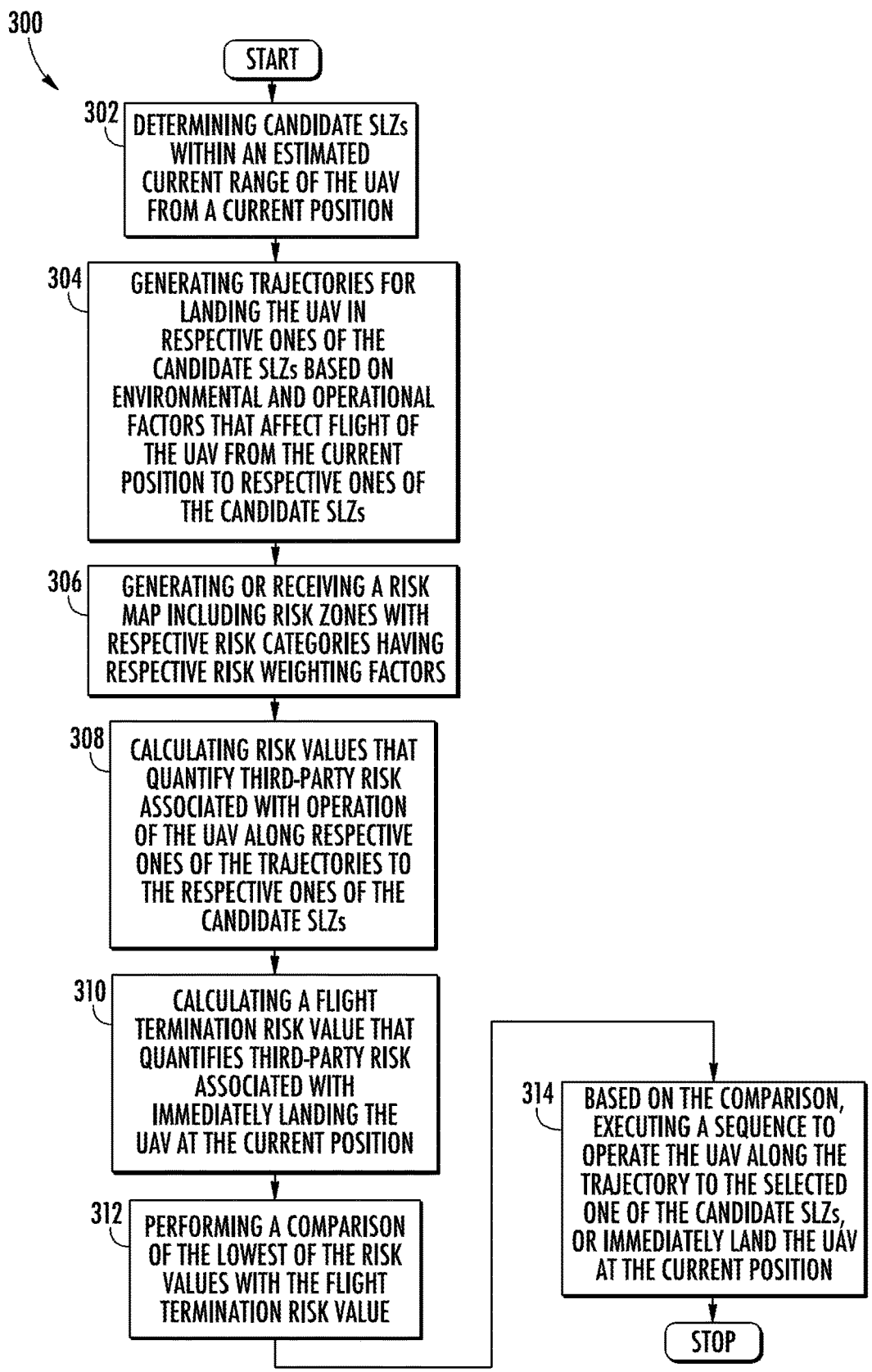

FIGS. 3A, 3B, 3C and 3D are flowcharts illustrating various steps in a method 300 of performing a contingency landing procedure for a UAV 110, according to example implementations of the present disclosure. As shown in FIG. 3A, at block 302, the method includes determining candidate SLZs 190 within an estimated current range of the UAV from a current position 112. As shown at block 304, the method includes generating trajectories 170 for landing the UAV in respective ones of the candidate SLZs based on environmental and operational factors that affect flight of the UAV from the current position to the respective ones of the candidate SLZs.

As shown at block 308, the method 300 includes calculating risk values that quantify third-party risk associated with operation of the UAV 110 along respective ones of the trajectories 170 to the respective ones of the candidate SLZs 190, a lowest of the risk values associated with a trajectory from the current position to a selected one of the candidate SLZs.

In some examples, the method 300 further includes generating or receiving a risk map 200 of a geographic area of operation of the UAV 110, as shown at block 306. The risk map includes risk zones 220 with respective risk categories having respective risk weighting factors that quantify third-party risk associated with operation of the UAV in the risk zones. In these examples, the trajectories 170 intersect various ones of the risk zones, and the risk values are calculated at block 306 based on the respective risk weighting factors.

As shown at block 310, the method 300 includes calculating a flight termination risk value that quantifies third-party risk associated with immediately landing the UAV at the current position 112.

The method 300 further includes performing a comparison of the lowest of the risk values with the flight termination risk value, as shown at block 312. Based on the comparison, the method includes executing a sequence to operate the UAV 110 along the trajectory 170 to the selected one of the candidate SLZs 190, or immediately land the UAV at the current position 112, as shown at block 314.

Figure 3B:
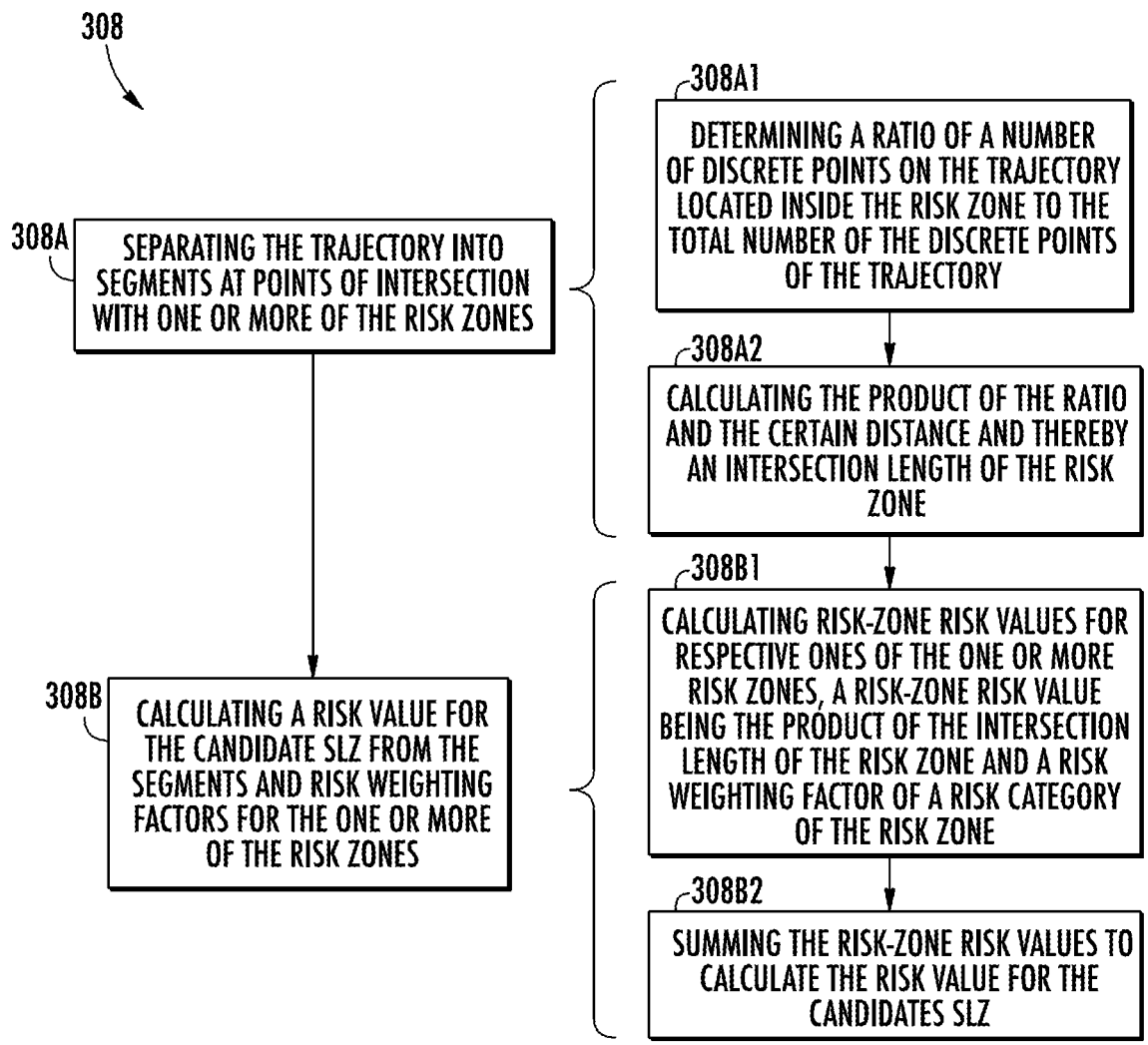

In some examples, generating the trajectories 170 at block 304 includes for a candidate SLZ 190, interpolating a straight line from the current position 112 to the candidate SLZ and thereby generating a trajectory to the candidate SLZ. In some of these examples that also include generating or receiving the risk map 200 at block 306, calculating the risk values at block 308 includes for the trajectory, separating the trajectory into segments 170A, 170B at points of intersection with one or more of the risk zones 220, as shown in FIG. 3B, at block 308A. A risk value for the candidate SLZ is then calculated from the segments and risk weighting factors for the one or more of the risk zones, as shown at block 308B.

In some further examples, the straight line is a certain distance and includes a total number of discrete points over the certain distance. In these examples, separating the trajectory 170 at block 308A includes for each risk zone 220 of the one or more risk zones determining a ratio of a number of discrete points on the trajectory located inside the risk zone to the total number of the discrete points of the trajectory, as shown at block 308A1. The product of the ratio and the certain distance and thereby an intersection length of the risk zone is then calculated, as shown at block 308A2.

Similarly, in some further examples, calculating the risk value for the candidate SLZ 190 at block 308B includes calculating risk-zone risk values for respective ones of the one or more risk zones 220, as shown at block 308B1. Here, a risk-zone risk value for the risk zone is the product of the intersection length of the risk zone and a risk weighting factor of a risk category of the risk zone. The risk-zone risk values are then summed to calculate the risk value for the candidate SLZ, as shown at block 308B2.

In some examples in which the sequence is executed to operate the UAV 110 along the trajectory 170 to the selected one of the candidate SLZs 190, and utilizing an updated current position 112 along the trajectory, the method 300 further includes calculating an updated lowest of the risk values and an updated flight termination risk value, as shown in FIG. 3C, at block 318. In these examples, the method also includes interrupting the sequence to immediately land the UAV at the updated current position when the updated lowest of the risk values is greater than the updated flight termination risk value, as shown at block 320. Even further, in some examples, the method includes generating or receiving an updated risk map 200 of the geographic area of operation of the UAV 110, as shown at block 316. The updated risk map includes the risk zones 220 with respective updated risk categories having respective updated risk weighting factors. In these further examples, the updated lowest of the risk values and the updated flight termination risk value are calculated at block 318 based on the respective updated risk weighting factors.

Additionally or alternatively, in some examples, the method 300 further includes determining updated candidate SLZs 190 within an updated estimated current range of the UAV 110 from the updated current position, the updated candidate SLZs including the selected one of the candidate SLZs, as shown in FIG. 3D, at block 322. The method includes generating updated trajectories 170 for landing the UAV in respective ones of the updated candidate SLZs at block 324, and calculating updated risk values and an updated flight termination risk value, a lowest of the updated risk values associated with an updated trajectory from the updated current position to a selected one of the updated candidate SLZs, as shown at block 326. The method includes performing a comparison of the lowest of the updated risk values with the updated flight termination risk value, as shown at block 328. Based on the comparison, an updated sequence is executed to operate the UAV along the updated trajectory to the selected one of the updated candidate SLZs, or immediately land the UAV at the updated current position, as shown at block 330.

Returning to FIG. 1A, in some example implementations, the contingency landing procedure may be considered part of a contingency management system, which may include a pre-flight phase and an in-flight phase. During the pre-flight phase, data relevant to a contingency event may be aggregated, and datasets may be prepared for use during the in-flight phase. In some of these examples, the system 100 may further include a data aggregation server 140 configured to aggregate data relevant to a contingency event from various resources such as one or more databases 160 over a network 150, which the apparatus may be configured to prepare datasets for use during the in-flight phase. A first of the datasets may be the risk map 200 for the area of operation (flight) of the UAV 110, and the risk map may include data aggregated from databases 160. An automatic or semi-automatic process may be used to perform a risk assessment (e.g., a specific operations risk assessment (SORA)). From this process, the risk map including risk zones 220 may be produced for the area of operation of the UAV. This risk map may in some examples also include restricted flight zones for the area of operation.

A second of the datasets may include data that defines the SLZs 190, which may be manually or automatically assigned in areas of low third-party risk. The first, second, and any other relevant datasets may be uploaded to a flight computer of the UAV 110 so that the data is available even in the event of a lost communication link between the UAV and the GCS 130.

During the in-flight phase, internal system health of the UAV 110 and external factors such as weather (as compared to system performance limits of the UAV) may be continuously monitored by various sensors on the UAV. Upon detection of a contingency event, the event may first be analyzed in depth by assessing the affected subsystems of the UAS 101 and the severity of the situation. Then, an appropriate action may be decided. The decision may be made autonomously by the UAV if there is no communication link between the UAV and the GCS 130, or the decision may utilize input from a remote pilot-in-command (PiC). Other situations may rely on the PiC to take over complete control of the UAV, thereby operating in a manual mode.

Figure 4A:
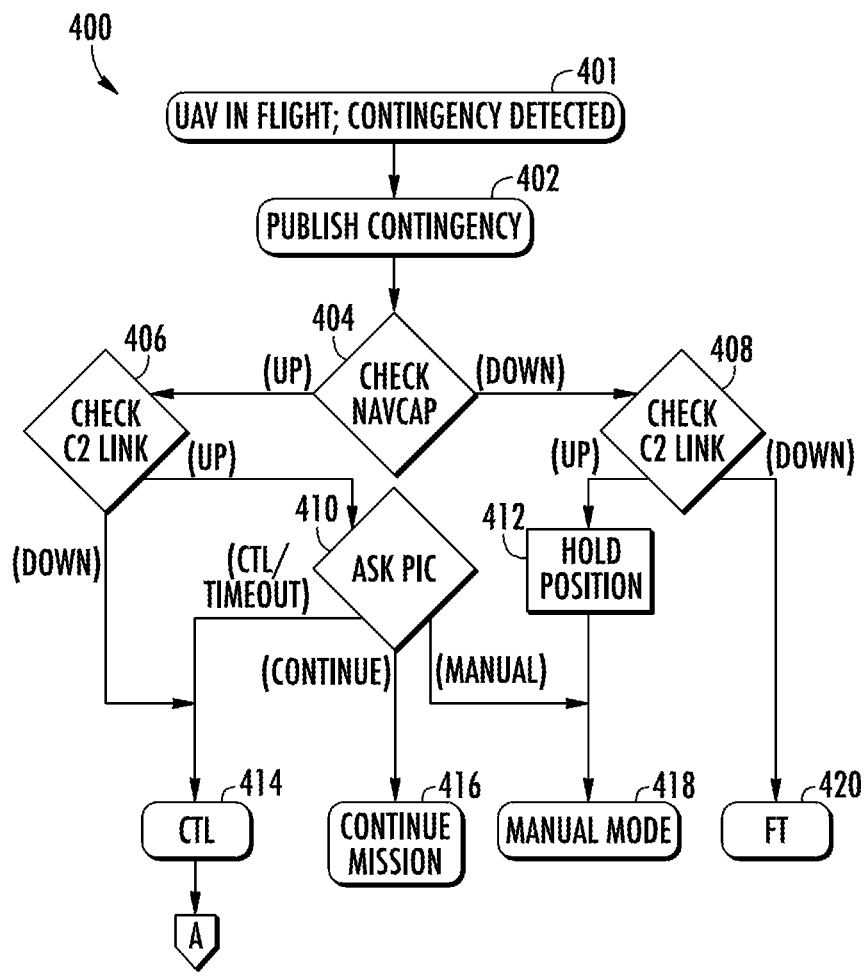
FIGS. 4A and 4B illustrate a flowchart of various steps in a method of performing a contingency landing procedure for a UAV, according to more particular example implementations of the present disclosure.
Figure 4B:
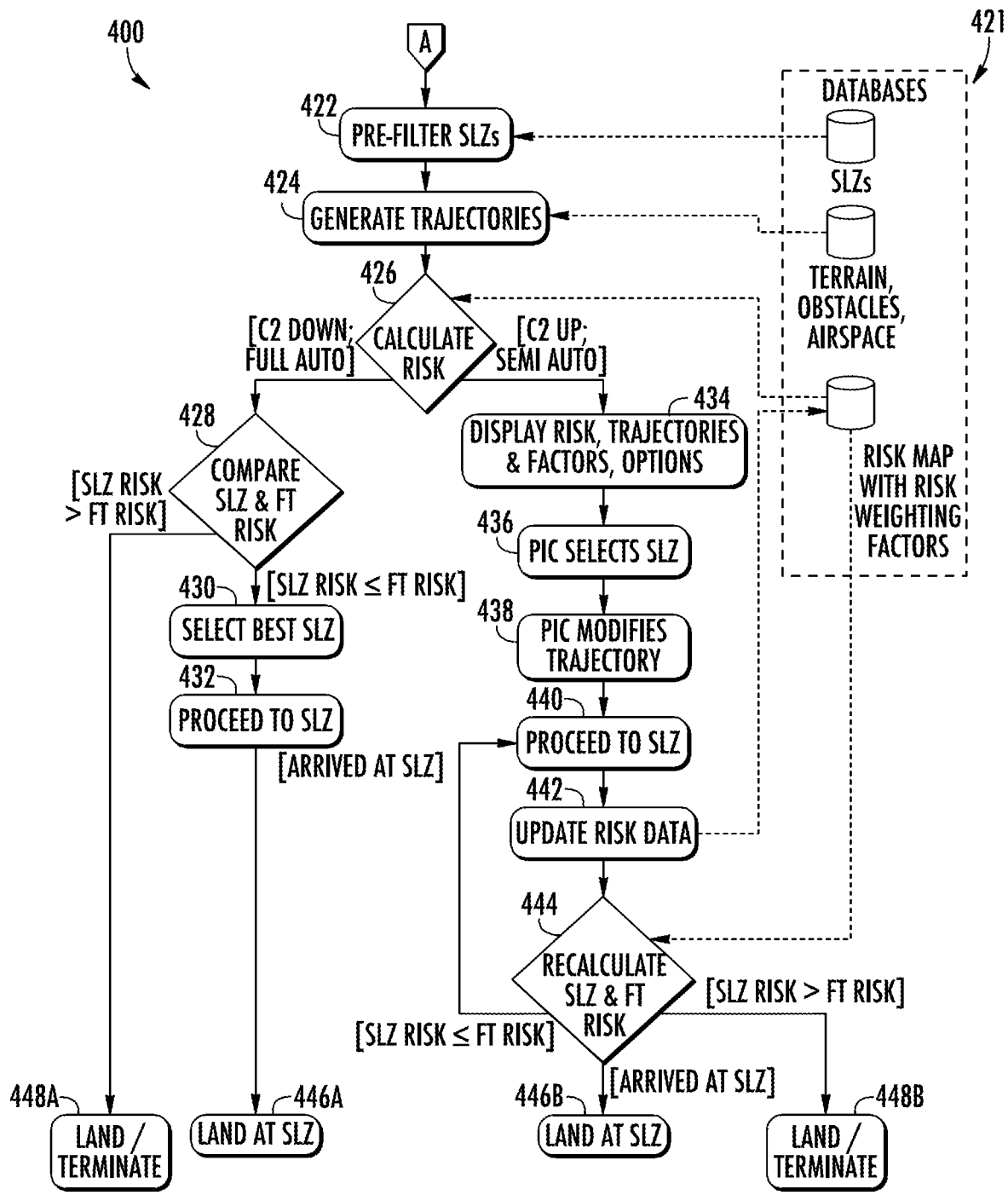

FIGS. 4A and 4B illustrate a flowchart of a method of performing a contingency landing procedure for a UAV, according to more particular example implementations in which the contingency landing procedure is part of a contingency management system. As the UAV is in flight, a contingency event may be detected, and published (e.g., event reported) to one or more stakeholders upon detection, as shown at blocks 401 and 402 of FIG. 4A. The GCS 130 may act as an interface to the PiC and inform the PiC of relevant information. Air Traffic Control (ATC) and other airspace users in the vicinity of the UAV 110 may be informed in case a contingency event affects airworthiness of the UAV. ATC may be contacted through either a direct link with the UAV or through the GCS 130. The contingency event may also be communicated to other aircraft nearby the UAV via ADS-B or other broadcast systems.

Detection of a contingency event may involve assessing two main capabilities of the UAS 101: the navigation capability of the UAV 110 (e.g., a geolocation and time system such as GPS) and the connection of the UAV to the GCS 130 via the communication link, as shown at blocks 404, 406, and 408. The navigation capability (NAVCAP) may be checked in block 404 to determine if it is fully functional, and the status of the communication link (which may be referred to as a command-and-control link or C2 link) may also be tested. Both of these checks may yield either a positive ("up" in block 406) or negative ("down" in block 408) result depending on platform-specific parameters and thresholds.

After both of checks are performed, the system 100 may be determined to be in one of four states, which relate to the possible actions that can be taken in response to the contingency event and the determined state, as shown at blocks 414 (CTL), 416 (CONTINUE MISSION), 418 (MANUAL MODE), and 420 (FT). Before proceeding when either or both the communication link or the navigation capability are down, in some examples, the system 100 may first enter a temporary holding mode for a specified amount of time and attempt recovery of the communication link and/or navigation capability that is down. If successful, then, the system may return to a state in which both are up.

In some examples, nested contingencies may affect the communication link and the navigation capability at the same time. As shown in FIG. 4A and Table I below, the outcome of the decision-making process may be one of four actions: a contingency landing procedure, which may be fully- or semi-automatic; a command to continue the mission (selected by a PiC for minor contingencies); manual mode (PiC takes over control of the UAV 110); and flight termination (FT).

TABLE I

System States For Decision-Making Based On Contingency Event

| State No. | Navigation Capability | Comm Link | HAT | Possible Outcomes |
|---|---|---|---|---|
| 1 | Up | Down | No | contingency landing |
| 2 | Up | Up | Yes | contingency landing, continue mission, manual mode |
| 3 | Down | Up | Yes | manual mode |
| 4 | Down | Down | No | flight termination |

For the system state 1 example, in which the navigation capability is up and the communication link is down, the appropriate action is a contingency landing procedure. The contingency landing procedure may result in a controlled landing, either at one of the defined SLZs 190, or somewhere between the current position 112 from which the contingency landing procedure was initiated, and one of the SLZs (at times referred to as an immediate landing or flight termination), as described herein.

In some example implementations, the decision-making process incorporates a Human Autonomy Teaming (HAT) approach that includes input from the PiC for various functions and/or decision (e.g., system states 2 and 3 when the communication link is functional), as shown at block 410. When the navigation capability of the UAV 110 is functional (e.g., system state 2), the system may work together with the PiC to address the contingency event. In keeping with block 410, the PiC may be presented with a choice between taking over manual control (manual mode) of the UAV 110, continuing the mission in case of minor contingencies, or starting a contingency landing (CTL) procedure, as shown at blocks 414-418.

For the system state 3 example, when the UAS 101 is unable to navigate, the UAV 110 may attempt to hold its current position, as shown at block 412, using remaining navigation systems such as inertial and vision-based navigation, and then may switch to a manual flight mode in which the PiC controls the UAV, as shown at block 418. The hold position may include a stabilized mode in which the altitude and position of the UAV are held as long as no input is received from the PiC. This may allow the PiC to attempt a safe landing (in keeping with "manual mode" shown at block 418) using camera feeds from the UAV and other available means of gaining situational awareness such as interactive maps or sonar data.

When both the navigation capability and the communication link are down (e.g., the system state 4 example), the contingency event may pose a significant threat to the safety of the operation. In system state 4, the remaining flight time of the UAV 110 may be limited to a minimum in order to minimize the air risk. In keeping with blocks 404, 408, and 420, the UAS 101 may immediately enter flight termination mode, thereby starting a landing procedure to land the UAV at its current position 112 and triggering a flight termination system in case of deteriorating conditions during landing.

The contingency landing procedure may be initiated by the contingency management system in order to safely reach and land at one of the pre-defined SLZs 190 or the takeoff location, thereby abandoning the original mission. FIG. 4B shows a flowchart of the procedure, which is a continuation from block 414 of FIG. 4A.

As shown in Table I and FIG. 4B, the contingency landing procedure may be initiated by the contingency management system when the navigation capability is functional ("up"). The communication link may or may not be functional (e.g., system states 1 and 2). FIG. 4B shows the contingency landing procedure having two branches exhibiting different levels of automation—a fully-automatic and a semi-automatic mode, to calculate risk, as shown at block 426. The branching may take place after the risk value has been calculated.

The fully-automatic mode, depicted on the left side of FIG. 4B, may be feasible in any contingency landing procedure scenario, whereas the semi-automatic mode shown on the right side of FIG. 4B may only be performed when the communication link is functional.

In examples using the fully-automatic mode, the SLZ 190 with the lowest risk value is identified, and if the risk is acceptable (e.g., less than or equal to a flight termination risk value), the UAV 110 may fly toward this SLZ and land there, as shown at blocks 428 (COMPARE SLZ & FT RISK), 430 (SELECT BEST SLZ), 432 (PROCEED TO SLZ until ARRIVED AT SLZ), and 446A (LAND AT SLZ). If this risk is not acceptable (e.g., greater than a flight termination risk value), then flight termination may be triggered, as shown at block 448A. For the semi-automatic case, the process may include added complexity due to inclusion of the PiC in the decision making as part of the HAT approach in the contingency management system, and the functional communication link may allow for continuous risk data updates, as shown at blocks 434 (DISPLAY RISK, TRAJECTORIES & FACTORS, OPTIONS), 436 (PiC SELECTS SLZ), 438 (PiC MODIFIES TRAJECTORY), 440 (PROCEED TO SLZ until ARRIVED AT SLZ), 442 (UPDATE RISK DATA), 444 (RECALCULATE SLZ & FT RISK), and 446B (LAND AT SLZ).

In some example implementations, the contingency landing procedure filters (e.g., pre-filters) available SLZs 190 from a database of databases 421 that may also include aeronautical data such as data describing the terrain, obstacles and airspace, and a risk map 200 with risk weighting factors, as shown at block 422. The filtering may be based on a reachability assessment that takes into account the direct distance from the UAV 110 to an SLZ and the estimated current range of the UAV based on its remaining power level. In the fully automatic mode, this assessment may utilize simple computations to avoid consuming the remaining power level of the UAV for computationally intensive processing tasks involving a potentially high number of SLZs to be considered. The filtering is to reduce the number of SLZs in preparation for more computationally intensive steps following the reachability assessment. This reachability assessment may be skipped if the total number of SLZs is low (e.g., 10 or less).

In examples using the semi-automatic mode, most processes may be performed in a manner similar to the fully-automatic mode. However, the PiC is able to provide input or override proposed decisions. Ergonomic user interfaces allow the PiC to view relevant data and provide input for decisions as part of the HAT approach.

In the semi-automatic mode, the SLZs 190 that were filtered out at block 422 are still available and shown to the PiC when requested. As shown at block 424, trajectories 170 are generated in the same manner as for the fully-automatic mode, and may use the aeronautical data such as the data describing the terrain, obstacles and airspace from the databases 421. Additionally, the PiC has the option of adjusting the risk weighting factors (not shown). The resulting risk value associated with each SLZ 190 is displayed along with the trajectories 170 (e.g., the risk values may be shown in an ordered, color-coded list, while the trajectories may be shown on the risk map 200). This visual feedback may be provided to the PiC in keeping with FIG. 2.

As shown at block 438, the PiC may modify specific trajectories 170 (e.g., by moving the waypoints forming the trajectory and/or by defining additional waypoint parameters). In keeping with block 440, if the PiC does not confirm a selected SLZ 190 and trajectory within a specified time window and does not perform any actions, an automatic timeout may be used to confirm selection of the best SLZ (the SLZ with the lowest risk value) and computed trajectory.

Once the trajectory 170 and SLZ 190 are confirmed, either by the PiC or by automatic timeout, the risk for the trajectory to the SLZ 190, as well as the current risk for flight termination may be continuously recalculated by updating the risk map, as shown at blocks 442 and 444. If flight termination is safer than continuing to the SLZ at any point along the trajectory, indicated when an updated lowest of the risk values is greater than an updated flight termination risk value, then flight termination may be triggered as shown at block 448B. If not, the UAV 110 may continue to the SLZ as shown at block 446B.

In some example implementations, data that is subject to rapid changes (e.g., the number of people in an area, real-time traffic conditions, etc.) may be updated continuously throughout the flight as long as the communication link is functional. Updating of the data may be done through the GCS 130 in order to keep processing, storage, and bandwidth needs of the computers and buses onboard the UAV 110 from being utilized for additional computationally intensive tasks. The updating may include the GCS retrieving aggregated data from the server 140. The retrieved aggregated data may be processed into update packages that are then transferred to the UAV computer responsible for replacing old data in the risk map 200 with the updated data.

According to example implementations of the present disclosure, the apparatus 120 may be implemented by various means. Means for implementing the apparatus may include hardware, alone or under direction of one or more computer programs from a computer-readable storage medium. In some examples, one or more apparatuses may be configured to function as or otherwise implement the apparatus shown and described herein. In examples involving more than one apparatus, the respective apparatuses may be connected to or otherwise in communication with one another in a number of different manners, such as directly or indirectly via a wired or wireless network or the like.

Figure 5:
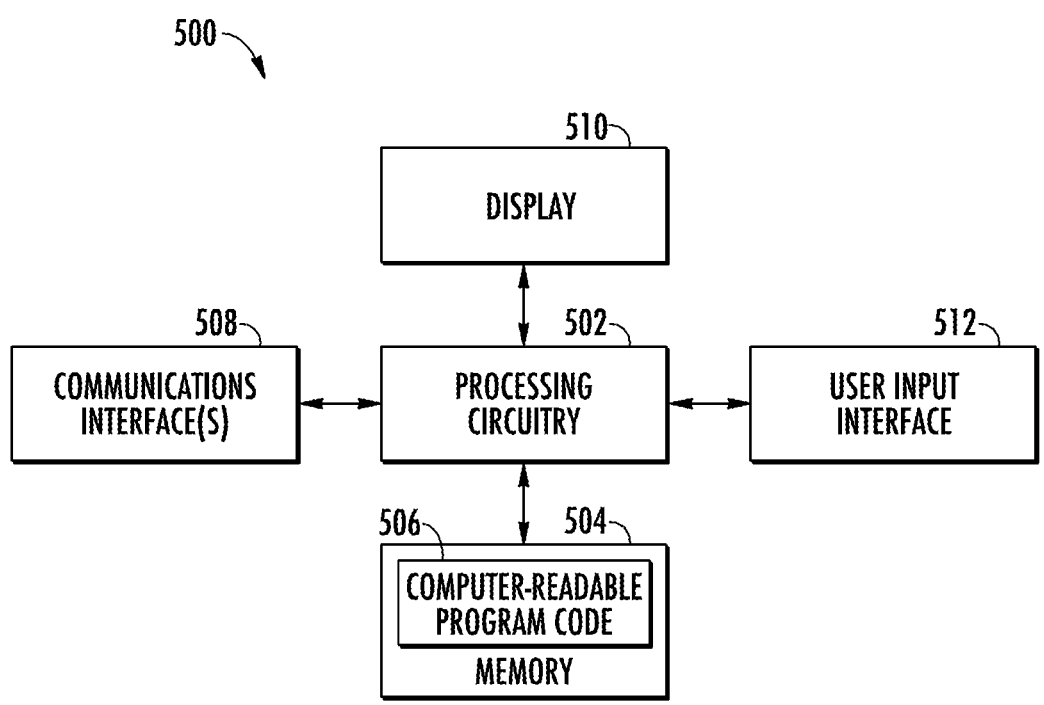
FIG. 5 illustrates an apparatus according to some example implementations of the present disclosure.

FIG. 5 illustrates an apparatus 500 that may correspond to the apparatus 120, according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for causing an unmanned aerial vehicle (UAV) to perform a contingency landing procedure, the apparatus comprising:
  a memory configured to store computer-readable program code; and
  processing circuitry configured to access the memory and execute the computer-readable program code to cause the apparatus to at least:
    determine candidate safe landing zones (SLZs) within an estimated current range of the UAV from a current position;
    generate trajectories for landing the UAV in respective ones of the candidate SLZs based on environmental and operational factors that affect flight of the UAV from the current position to the respective ones of the candidate SLZs;
    calculate risk values that quantify third-party risk associated with operation of the UAV along respective ones of the trajectories to the respective ones of the candidate SLZs, a lowest of the risk values associated with a trajectory from the current position to a selected one of the candidate SLZs;
    calculate a flight termination risk value that quantifies third-party risk associated with immediately landing the UAV at the current position;
    perform a comparison of the lowest of the risk values with the flight termination risk value; and
    execute a sequence to operate the UAV along the trajectory to the selected one of the candidate SLZs, or immediately land the UAV at the current position, based on the comparison.

2. The apparatus of claim 1, wherein the processing circuitry is further configured to cause the apparatus located onboard the UAV to autonomously execute the sequence without input from a ground control station (GCS), wherein the GCS and the UAV are part of an unmanned aerial system.

3. The apparatus of claim 1, wherein the UAV is part of an unmanned aerial system that also includes a ground control station (GCS), the apparatus is located at the GCS, and the apparatus is caused to execute the sequence through remote control of the UAV from the GCS.

4. The apparatus of claim 1, wherein the processing circuitry is configured to execute the computer-readable program code to further cause the apparatus to:
  generate or receive a risk map of a geographic area of operation of the UAV, the risk map including risk zones with respective risk categories having respective risk weighting factors that quantify third-party risk associated with operation of the UAV in the risk zones,
  wherein the trajectories intersect various ones of the risk zones, and the risk values are calculated based on the respective risk weighting factors.

5. The apparatus of claim 4, wherein the apparatus caused to generate the trajectories includes, for a candidate SLZ, the apparatus caused to interpolate a straight line from the current position to the candidate SLZ and thereby generate a trajectory to the candidate SLZ, and wherein the apparatus caused to calculate the risk values includes, for the trajectory, the apparatus caused to:
separate the trajectory into segments at points of intersection with one or more of the risk zones; and
calculate a risk value for the candidate SLZ from the segments and risk weighting factors for the one or more of the risk zones.

6. The apparatus of claim 5, wherein the straight line is a certain distance and includes a total number of discrete points over the certain distance, and the apparatus caused to separate the trajectory includes, for each risk zone of the one or more risk zones, the apparatus caused to:

determine a ratio of a number of discrete points on the trajectory located inside the risk zone to the total number of the discrete points of the trajectory; and
calculate the product of the ratio and the certain distance and thereby an intersection length of the risk zone.

7. The apparatus of claim 6, wherein the apparatus caused to calculate the risk value for the candidate SLZ includes the apparatus caused to:

calculate risk-zone risk values for respective ones of the one or more risk zones, a risk-zone risk value for the risk zone being the product of the intersection length of the risk zone and a risk weighting factor of a risk category of the risk zone; and
sum the risk-zone risk values to calculate the risk value for the candidate SLZ.

8. The apparatus of claim 4, wherein the apparatus is caused to execute the sequence to operate the UAV along the trajectory to the selected one of the candidate SLZs, and utilizing an updated current position along the trajectory, the processing circuitry is configured to execute the computer-readable program code to cause the apparatus to further:

generate or receive an updated risk map of the geographic area of operation of the UAV, the updated risk map including the risk zones with respective updated risk categories having respective updated risk weighting factors;
calculate an updated lowest of the risk values and an updated flight termination risk value based on the respective updated risk weighting factors; and
interrupt the sequence to immediately land the UAV at the updated current position when the updated lowest of the risk values is greater than the updated flight termination risk value.

9. The apparatus of claim 1, wherein the apparatus is caused to execute the sequence to operate the UAV along the trajectory to the selected one of the candidate SLZs when the lowest of the risk values is less than or equal to the flight termination risk value, and to immediately land the UAV at the current position when the lowest of the risk values is greater than the flight termination risk value.

10. The apparatus of claim 1, wherein the apparatus is caused to execute the sequence to operate the UAV along the trajectory to the selected one of the candidate SLZs, and utilizing an updated current position along the trajectory, the processing circuitry is configured to execute the computer-readable program code to cause the apparatus to further:

calculate an updated lowest of the risk values and an updated flight termination risk value; and
interrupt the sequence to immediately land the UAV at the updated current position when the updated lowest of the risk values is greater than the updated flight termination risk value.

11. The apparatus of claim 1, wherein the apparatus is caused to execute the sequence to operate the UAV along the trajectory to the selected one of the candidate SLZs, and utilizing an updated current position along the trajectory, the processing circuitry is configured to execute the computer-readable program code to cause the apparatus to further:

determine updated candidate SLZs within an updated estimated current range of the UAV from the updated current position, the updated candidate SLZs including the selected one of the candidate SLZs;
generate updated trajectories for landing the UAV in respective ones of the updated candidate SLZs;
calculate updated risk values and an updated flight termination risk value, a lowest of the updated risk values associated with an updated trajectory from the updated current position to a selected one of the updated candidate SLZs;
perform a comparison of the lowest of the updated risk values with the updated flight termination risk value; and
execute an updated sequence to operate the UAV along the updated trajectory to the selected one of the updated candidate SLZs, or immediately land the UAV at the updated current position, based on the comparison.

12. A method of performing a contingency landing procedure for an unmanned aerial vehicle (UAV), the method comprising:

determining candidate safe landing zones (SLZs) within an estimated current range of the UAV from a current position;
generating trajectories for landing the UAV in respective ones of the candidate SLZs based on environmental and operational factors that affect flight of the UAV from the current position to the respective ones of the candidate SLZs;
calculating risk values that quantify third-party risk associated with operation of the UAV along respective ones of the trajectories to the respective ones of the candidate SLZs, a lowest of the risk values associated with a trajectory from the current position to a selected one of the candidate SLZs;
calculating a flight termination risk value that quantifies third-party risk associated with immediately landing the UAV at the current position;
performing a comparison of the lowest of the risk values with the flight termination risk value; and
executing a sequence to operate the UAV along the trajectory to the selected one of the candidate SLZs, or immediately land the UAV at the current position, based on the comparison.

13. The method of claim 12, wherein the UAV is part of an unmanned aerial system that also includes a ground control station (GCS), the method is performed onboard the UAV, and the sequence is autonomously executed without input from the GCS.

14. The method of claim 12, wherein the UAV is part of an unmanned aerial system that also includes a ground control station (GCS), the method is performed at the GCS, and the sequence is executed through remote control of the UAV from the GCS.

15. The method of claim 12 further comprising:
generating or receiving a risk map of a geographic area of operation of the UAV, the risk map including risk zones with respective risk categories having respective risk weighting factors that quantify third-party risk associated with operation of the UAV in the risk zones, wherein the trajectories intersect various ones of the risk zones, and the risk values are calculated based on the respective risk weighting factors.

16. The method of claim 15, wherein generating the trajectories includes for a candidate SLZ, interpolating a straight line from the current position to the candidate SLZ and thereby generating a trajectory to the candidate SLZ, and wherein calculating the risk values includes for the trajectory:
separating the trajectory into segments at points of intersection with one or more of the risk zones; and
calculating a risk value for the candidate SLZ from the segments and risk weighting factors for the one or more of the risk zones.

17. The method of claim 16, wherein the straight line is a certain distance and includes a total number of discrete points over the certain distance, and separating the trajectory includes for each risk zone of the one or more risk zones:
determining a ratio of a number of discrete points on the trajectory located inside the risk zone to the total number of the discrete points of the trajectory; and
calculating the product of the ratio and the certain distance and thereby an intersection length of the risk zone.

18. The method of claim 17, wherein calculating the risk value for the candidate SLZ includes:
calculating risk-zone risk values for respective ones of the one or more risk zones, a risk-zone risk value for the risk zone being the product of the intersection length of the risk zone and a risk weighting factor of a risk category of the risk zone; and
summing the risk-zone risk values to calculate the risk value for the candidate SLZ.

19. The method of claim 15, wherein the sequence is executed to operate the UAV along the trajectory to the selected one of the candidate SLZs, and utilizing an updated current position along the trajectory, the method further comprises:
generating or receiving an updated risk map of the geographic area of operation of the UAV, the updated risk map including the risk zones with respective updated risk categories having respective updated risk weighting factors;
calculating an updated lowest of the risk values and an updated flight termination risk value based on the respective updated risk weighting factors; and
interrupting the sequence to immediately land the UAV at the updated current position when the updated lowest of the risk values is greater than the updated flight termination risk value.

20. The method of claim 12, wherein the sequence is executed to operate the UAV along the trajectory to the selected one of the candidate SLZs when the lowest of the risk values is less than or equal to the flight termination risk value, and to immediately land the UAV at the current position when the lowest of the risk values is greater than the flight termination risk value.

21. The method of claim 12, wherein the sequence is executed to operate the UAV along the trajectory to the selected one of the candidate SLZs, and utilizing an updated current position along the trajectory, the method further comprises:
calculating an updated lowest of the risk values and an updated flight termination risk value; and
interrupting the sequence to immediately land the UAV at the updated current position when the updated lowest of the risk values is greater than the updated flight termination risk value.

22. The method of claim 12, wherein the sequence is executed to operate the UAV along the trajectory to the selected one of the candidate SLZs, and utilizing an updated current position along the trajectory, the method further comprises:
determining updated candidate SLZs within an updated estimated current range of the UAV from the updated current position, the updated candidate SLZs including the selected one of the candidate SLZs;
generating updated trajectories for landing the UAV in respective ones of the updated candidate SLZs;
calculating updated risk values and an updated flight termination risk value, a lowest of the updated risk values associated with an updated trajectory from the updated current position to a selected one of the updated candidate SLZs;
performing a comparison of the lowest of the updated risk values with the updated flight termination risk value; and
executing an updated sequence to operate the UAV along the updated trajectory to the selected one of the updated candidate SLZs, or immediately land the UAV at the updated current position, based on the comparison.

\* \* \* \* \*